United States Patent [19]
White et al.

[11] Patent Number: 5,982,351
[45] Date of Patent: Nov. 9, 1999

[54] METHOD AND APPARATUS FOR SUPPLEMENTING A KEYBOARD AND FOR HELPING A USER OPERATE AN ELECTRONIC DEVICE

[75] Inventors: Richard Anthony Maximillian White, Watauga; Jeffrey Ricks Stripling, Austin; Ardsley Pihl Congdon, Jr., Euless; David Patrick Kilp, Colleyville; Mark Allan Beckwith; Keith Thomas Grandin, both of Saginaw, all of Tex.; Nickolaos Pete Lagen, Orland Park, Ill.

[73] Assignee: Motorola, Inc., Schaumburg, Ill.

[21] Appl. No.: 08/941,016

[22] Filed: Sep. 30, 1997

[51] Int. Cl.⁶ .................................................. G09G 5/34
[52] U.S. Cl. ............................................. 345/146; 345/172
[58] Field of Search .................................. 345/146, 145, 345/112, 156, 157, 160, 168, 172, 333, 341, 342, 346, 339, 336–338

[56] References Cited

U.S. PATENT DOCUMENTS

| | | | |
|---|---|---|---|
| 5,251,125 | 10/1993 | Karnowski et al. | 369/189 |
| 5,258,748 | 11/1993 | Jones | 345/172 |
| 5,430,436 | 7/1995 | Fennell et al. | 340/825.44 |
| 5,734,749 | 3/1998 | Yamada et al. | 382/187 |
| 5,742,808 | 4/1998 | Hasuo | 395/601 |
| 5,790,103 | 8/1998 | Willner | 345/168 |
| 5,812,117 | 9/1998 | Moon | 345/169 |
| 5,831,598 | 11/1998 | Käuffert et al. | 345/168 |
| 5,841,053 | 11/1998 | Johnson et al. | 84/615 |
| 5,894,276 | 4/1999 | Altidor et al. | 340/825.22 |

OTHER PUBLICATIONS

Cowart, *Mastering Windows™ 3.1 Special Edition*, Sybex Inc. Alameda, Ca. pp. 176–177, 431, 449, 1993.

*Primary Examiner*—Steven Sax
*Attorney, Agent, or Firm*—R. Louis Breeden

[57] ABSTRACT

In an electronic device having a keyboard (120) and a display (116), a processing system (106) displays on the display a message entered through the keyboard and selects a supplemental mode, in response to entry of a first predetermined key sequence by a user. The supplemental mode is selected in accordance with the first predetermined key sequence, from at least one of a group of supplemental modes included in the electronic device. The group of supplemental modes comprise an acronym mode (200), a supplemental scrolling keyboard mode (300), a predictive character pairing mode (301), a predictive menuing mode (400), and a bi-directional delete mode (500). The electronic device operates in accordance with the supplemental mode until an occurrence of at least one of (a) the user entering a second predetermined key sequence and (b) the supplemental mode executing to completion.

18 Claims, 3 Drawing Sheets

METHOD AND APPARATUS FOR SUPPLEMENTING A KEYBOARD AND FOR HELPING A USER OPERATE AN ELECTRONIC DEVICE

FIELD OF THE INVENTION

This invention relates in general to communication systems, and more specifically to a method and apparatus in an electronic device for supplementing a keyboard and for helping a subscriber to operate the electronic device.

BACKGROUND OF THE INVENTION

Two-way radio messaging systems are now becoming increasingly popular. A benefit of such systems is confirmation of outbound (system-to-subscriber) message delivery. Another benefit is the capability of inbound (subscriber-to-system) message origination and transmission. The capability to send inbound messages has brought about electronic devices having a means of originating inbound messages. The simplest devices have utilized a few control buttons for positioning a cursor over a "canned" response or character and then "selecting" the same for addition to an inbound message. More advanced devices have included an alpha-numeric keyboard and display for originating inbound messages.

A design objective of many electronic devices, such as portable subscriber units for messaging systems, is small size, allowing easy transport on one's person. This objective can conflict with designing a keyboard that includes a full set of alphanumeric characters, symbols, and punctuation marks, and is easy to use. In addition, preparing, addressing, and sending an inbound message can be somewhat daunting to a subscriber who is not familiar with these features.

Thus, what is needed is a method and apparatus in an electronic device for supplementing the keyboard and for helping a user to operate the electronic device.

SUMMARY OF THE INVENTION

An aspect of the present invention is a method in an electronic device having a keyboard and a display, the method for supplementing the keyboard and for helping a user to operate the electronic device. The method comprises the steps of displaying on the display a message entered through the keyboard; and selecting a supplemental mode, in response to entry of a first predetermined key sequence by the user. The supplemental mode is selected in accordance with the first predetermined key sequence, from at least one of a group of supplemental modes included in the electronic device. The group of supplemental modes comprise an acronym mode, a supplemental scrolling keyboard mode, a predictive character pairing mode, a predictive menuing mode, and a bi-directional delete mode. The method also includes the step of operating in accordance with the supplemental mode until an occurrence of at least one of (a) the user entering a second predetermined key sequence and (b) the supplemental mode executing to completion.

Another aspect of the present invention is an electronic device for supplementing a keyboard and for helping a user to operate the electronic device. The electronic device comprises a processing system for controlling the electronic device, and the keyboard coupled to the processing system for entering a message and storing the message in the processing system. The electronic device further comprises a display coupled to the processing system for displaying the message. The processing system is programmed to select a supplemental mode, in response to entry of a first predetermined key sequence by the user. The supplemental mode is selected in accordance with the first predetermined key sequence, from at least one of a group of supplemental modes included in the electronic device. The group of supplemental modes comprise an acronym mode, a supplemental scrolling keyboard mode, a predictive character pairing mode, a predictive menuing mode, and a bi-directional delete mode. The processing system is further programmed to operate in accordance with the supplemental mode until an occurrence of at least one of (a) the user entering a second predetermined key sequence and (b) the supplemental mode executing to completion.

Another aspect of the present invention is a portable subscriber unit for supplementing a keyboard and for helping a subscriber to operate the portable subscriber unit. The portable subscriber unit comprises a receiver for receiving information, and a processing system coupled to the receiver for processing the information and for controlling the portable subscriber unit. The portable subscriber unit further comprises the keyboard coupled to the processing system for entering a message and storing the message in the processing system, and a display coupled to the processing system for displaying the message. The portable subscriber unit also includes a transmitter coupled to the processing system for transmitting the message. The processing system is programmed to select a supplemental mode, in response to entry of a first predetermined key sequence by the subscriber. The supplemental mode is selected in accordance with the first predetermined key sequence, from at least one of a group of supplemental modes included in the portable subscriber unit. The group of supplemental modes comprise an acronym mode, a supplemental scrolling keyboard mode, a predictive character pairing mode, a predictive menuing mode, and a bi-directional delete mode. The processing system is further programmed to operate in accordance with the supplemental mode until an occurrence of at least one of (a) the user entering a second predetermined key sequence and (b) the supplemental mode executing to completion.

DETAILED DESCRIPTION OF THE DRAWINGS

Figure 1:
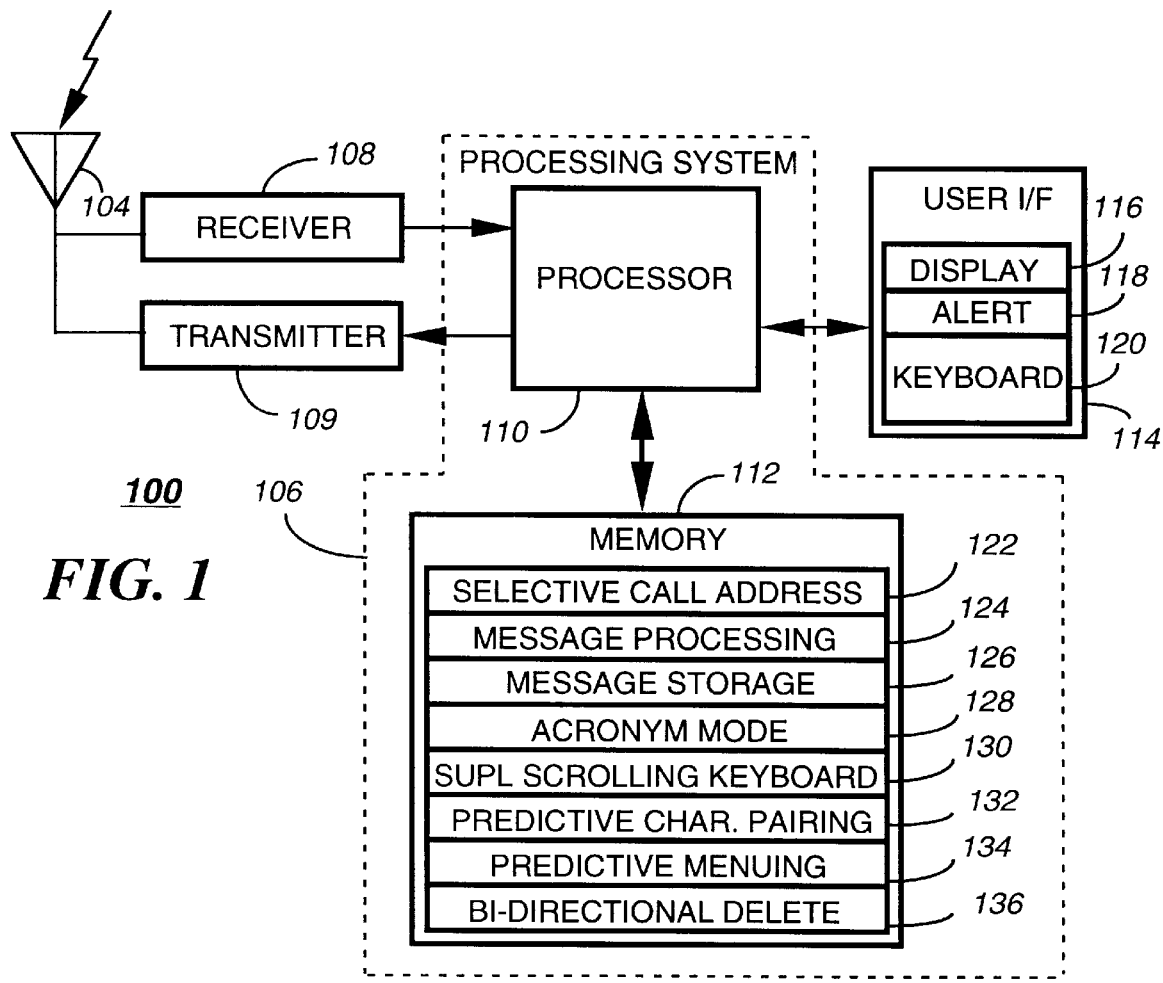
FIG. 1 is an electrical block diagram of an electronic device in accordance with the present invention.

Referring to FIG. 1, an electrical block diagram of an electronic device in accordance with the present invention depicts, by way of example, a portable subscriber unit 100 such as can be used with a conventional two-way radio messaging system infrastructure. The portable subscriber unit 100 comprises an antenna 104 for intercepting an outbound message and for transmitting an inbound message.

The antenna 104 is coupled to a conventional receiver 108 for receiving the outbound message and is also coupled to a conventional transmitter 109 for transmitting the inbound message. The receiver 108 and the transmitter 109 are coupled to a processing system 106 for processing the outbound and inbound messages and for controlling the portable subscriber unit 100 in accordance with the present invention. A user interface 114 is also coupled to the processing system for interfacing with a user. The user interface comprises a conventional display 116 for displaying the inbound and outbound messages, a conventional alert element 118 for alerting the user when the outbound message arrives, and a conventional keyboard 120 for generating the inbound message and for controlling the portable subscriber unit 100.

The processing system comprises a conventional processor 110 and a conventional memory 112. The memory 112 comprises software elements and other variables for programming the processing system 106 in accordance with the present invention. The memory 112 includes a selective call address 122 to which the portable subscriber unit 100 is responsive, and a message processing element 124 for processing inbound and outbound messages through well-known radio messaging techniques. The memory further comprises a message storage area 126 for storing the inbound and outbound messages, and additional software elements for controlling the operation of the portable subscriber unit 100 in accordance with the present invention.

Figure 5:
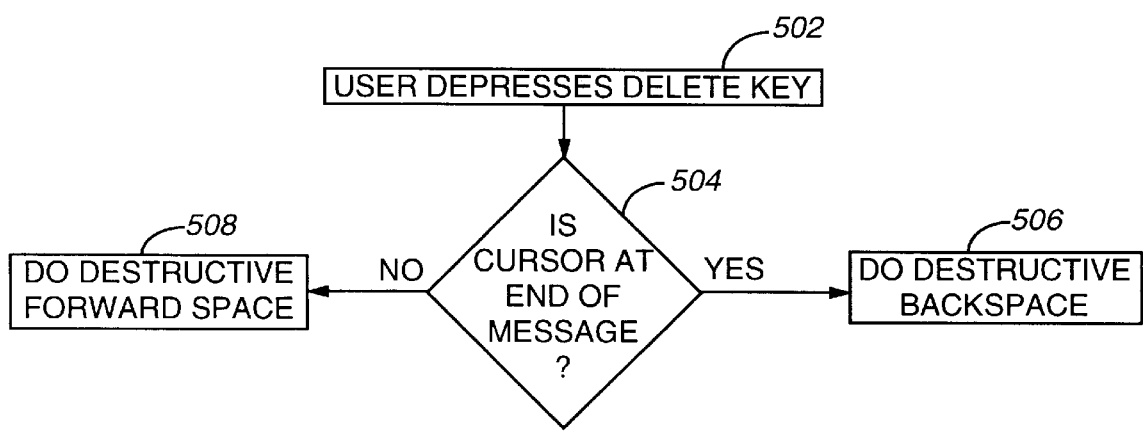
FIG. 5 is a flow chart depicting operation of a bi-directional delete mode of the electronic device in accordance with the present invention.
Figure 2:
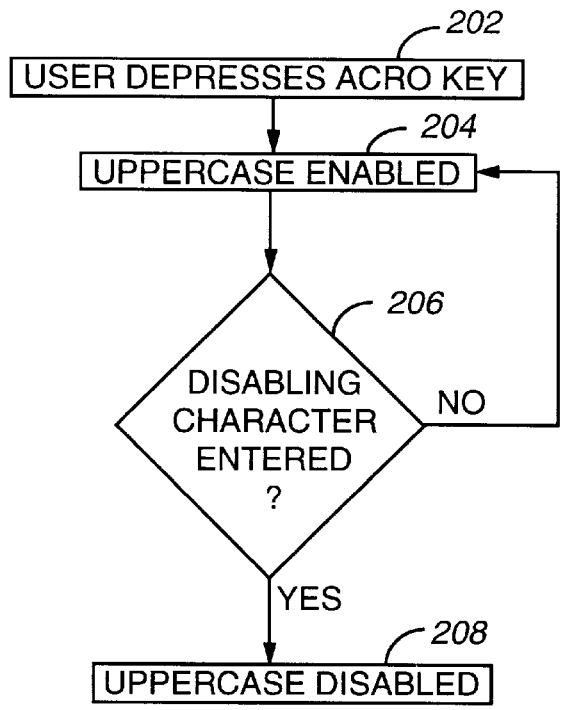
FIG. 2 is a flow chart depicting operation of an acronym mode of the electronic device in accordance with the present invention.
Figure 4:
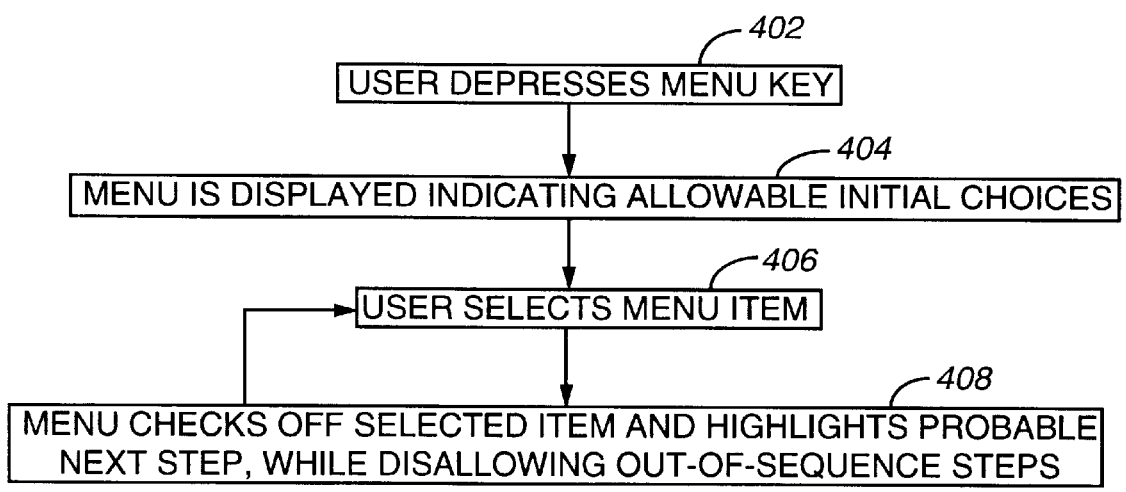
FIG. 4 is a flow chart depicting operation of a predictive menuing mode of the electronic device in accordance with the present invention.
Figure 3:
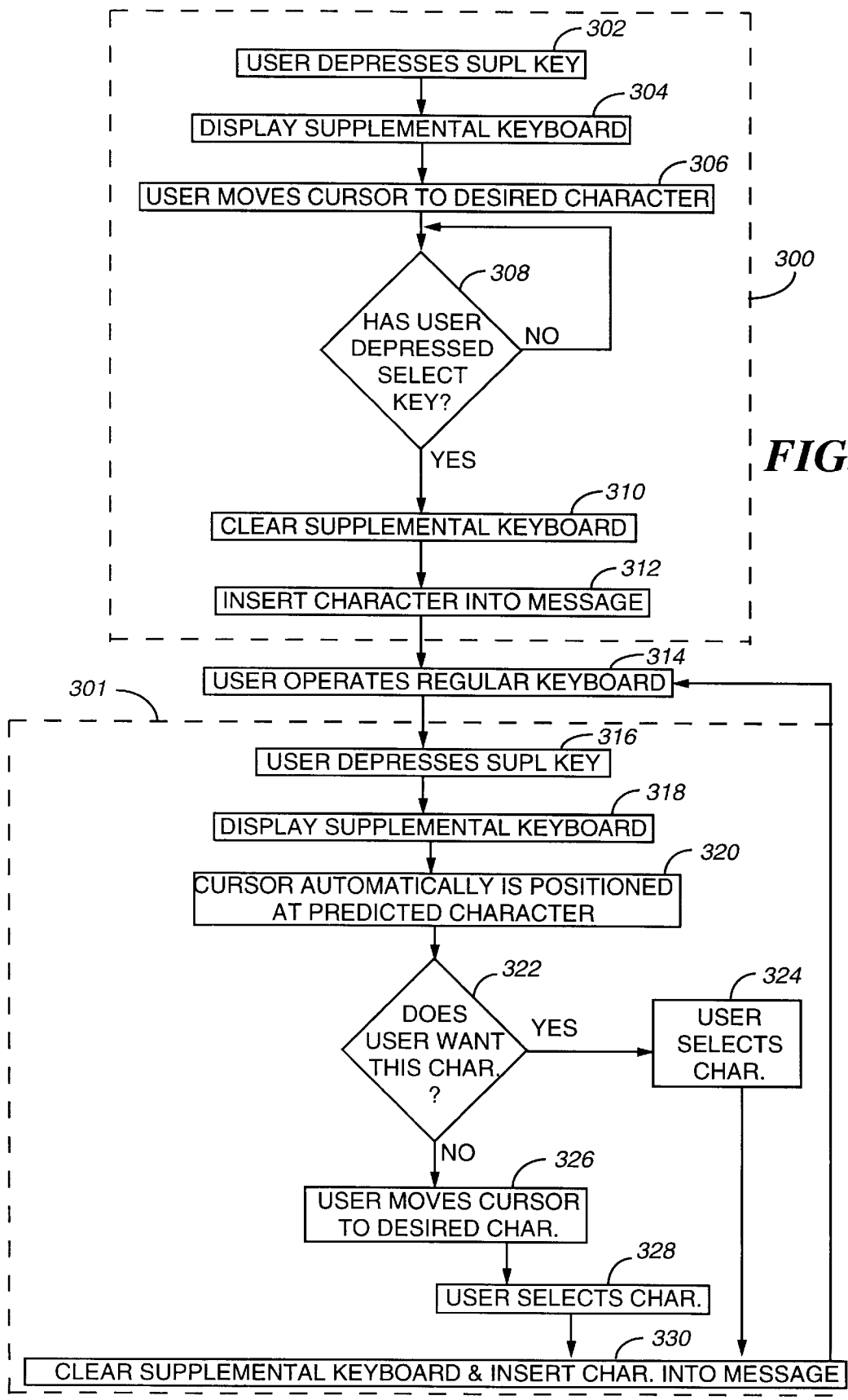
FIG. 3 is a flow chart depicting operation of a supplemental scrolling keyboard mode and a predictive character pairing mode of the electronic device in accordance with the present invention.

The additional software elements include an acronym mode element 128 for programming the processing system 106 to execute an acronym mode 200 (FIG. 2), and a supplemental scrolling keyboard element 130 for programming the processing system 106 to execute a supplemental scrolling keyboard mode 300 (FIG. 3). The additional software elements also include a predictive character pairing element 132 for programming the processing system 106 to execute a predictive character pairing mode 301 (FIG. 3), and a predictive menuing element 134 for programming the processing system 106 to execute a predictive menuing mode 400 (FIG. 4). The additional software elements further comprise a bidirectional delete element 136 for programming the processing system 106 to execute a bidirectional delete mode 500 (FIG. 5). The acronym, supplemental scrolling keyboard, predictive character pairing, predictive menuing, and bidirectional delete modes are described further below.

Referring to FIG. 2, a flow chart depicting operation of the acronym mode 200 of the electronic device in accordance with the present invention begins with the user depressing 202 an acronym key sequence. The acronym key sequence preferably consists of a single key stroke, but can, alternatively, consist of multiple key strokes. In response, the processing system 106 accesses the acronym mode element 128 and executes the acronym mode 200, which places 204 the keyboard 120 into uppercase mode. As the user continues to type on the keyboard 120, the processing system 106 tests 206 each character to determine whether the user has entered a predetermined disabling character. Disabling characters preferably are characters that are not normally expected in an acronym, e.g., space, double hyphen (--), and dash (—). If the user has not entered one of the disabling characters, uppercase mode continues 204 to be enabled. If the user has entered a disabling character, then the processing system 106 disables 208 uppercase mode, returning the keyboard 120 to lowercase mode. Thus, the acronym mode 200 advantageously reduces the number of keystrokes required to type an acronym and further reduces the probability of mistakes, e.g., from forgetting to unlock the caps lock key after typing an acronym.

Referring to FIG. 3, a flow chart depicting operation of the supplemental scrolling keyboard mode 300 and the predictive character pairing mode 301 of the electronic device in accordance with the present invention begins with the user depressing the supplemental keyboard key sequence while preparing an inbound message from the keyboard 120. The supplemental keyboard key sequence preferably consists of a single key stroke, but can, alternatively, consist of multiple key strokes. In response, the processing system 106 accesses the supplemental scrolling keyboard element 130 and executes the supplemental scrolling keyboard mode 300, causing a supplemental keyboard, e.g., a plurality of infrequently used characters, to be displayed 304 on the display 116 with a cursor preferably positioned near the center of the supplemental keyboard. The user then preferably uses conventional cursor positioning keys to move 306 the cursor to a desired character. The processing system 106 then waits 308 for the user to depress a "select" key, after which the processing system 106 clears 310 the supplemental keyboard (returning the display 116 to the inbound message) and inserts 312 the selected character into the inbound message at the current cursor position. It will be appreciated that, alternatively, other techniques, such as touch sensitive screen techniques, can be utilized to enable the user to select a character from the displayed supplemental keyboard.

The user then continues preparing the message, using 314 the keyboard 120. Then the user again depresses 316 the supplemental keyboard key. As before, the processing system 106 executes the supplemental scrolling keyboard mode and displays 318 the supplemental keyboard. This time, however, is not the first time the processing system 106 has executed the supplemental keyboard mode during the processing of the current message. For that reason, the processing system 106 preferably also accesses the predictive character pairing element 132 and executes the predictive character pairing mode 301. In this mode the processing system 106 checks a predetermined location in the memory 112 to determine what character was last selected from the supplemental keyboard, and automatically positions 320 the cursor at a character which the processing system 106 predicts is the most likely character to be selected. For example, if the character last selected from the supplemental keyboard is "(", then the processing system 106 preferably positions the cursor at ")". If the last selected character is "{", then the processing system 106 preferably positions the cursor at "}" If the last selected character is "%", then the processing system 106 preferably positions the cursor at "%". If the last selected character does not reasonably suggest a next likely character, e.g., last selected character is ">", then the processing system 106 preferably positions the cursor near the center of the supplemental keyboard.

Once the cursor has been positioned, the processing system 106 checks 322 whether the user wants the character at which the cursor is positioned. If so, the user selects 324 the character by depressing the select key. If not, the user moves 326 the cursor to the desired character and then selects 328 the desired character. In any event, after the user selects the wanted character, the processing system clears 330 the supplemental keyboard, returns the display 116 to the inbound message, and inserts the character into the inbound message at the current cursor position. Flow then returns to step 314 for additional message preparation. Thus, the supplemental scrolling keyboard mode 300 and the predictive character pairing mode 301 advantageously provide a means for supplementing the keyboard 120 and for aiding the user to make a selection from the supplemental keyboard. This is particularly useful when an electronic device, such as the portable subscriber unit 100 is made small for easy portability, thus requiring that the keyboard 120 be miniaturized, thereby limiting the number of keys thereon.

Referring to FIG. 4, a flow chart depicting operation of the predictive menuing mode 400 of the electronic device in accordance with the present invention begins with the user depressing 402 the menu key sequence. The menu key sequence preferably consists of a single key stroke, but can, alternatively, consist of multiple key strokes. In response, the processing system 106 accesses the predictive menuing mode element 134 and executes the predictive menuing mode 400, which displays 404 on the display 116 a menu indicating allowable initial choices. In accordance with the present invention, choices which are not allowable preferably are not displayed. Alternatively, choices which are not allowable can be displayed in a manner that indicates that they are not currently allowable. The user then selects 406 a menu item by, for example, navigating a cursor to the menu item and then depressing the select key. The processing system 106 then marks 408 the selected item as "done" after completion of an activity associated with the selected item, e.g., by placing a check mark by the item, and then highlights a probable next step, while continuing to disallow out-of-sequence steps. The user continues to select 406 additional menu items until the predictive menuing mode executes to completion, or the user types an exit key sequence. An example of a useful application of the predictive menuing mode 400 is addressing and sending a message in a wireless transmission from a first portable subscriber unit 100 to a two-way messaging infrastructure, and thence to a second portable subscriber unit 100, which involves a plurality of steps that must be entered in a predetermined order. Thus, the predictive menuing mode 400 advantageously helps the user to operate the portable subscriber unit 100 by guiding the user through a sequence of menu selection steps in the correct order.

Referring to FIG. 5, a flow chart depicting operation of the bi-directional delete mode 500 of the electronic device in accordance with the present invention begins with the user depressing 502 a delete key sequence. The delete key sequence preferably consists of a single key stroke, but can, alternatively, consist of multiple key strokes. In response, the processing system 106 accesses the bidirectional delete element 136 and executes the bidirectional delete mode, in which the processing system 106 checks 504 whether the cursor is at the end of the message. If not, the processing system 106 performs 506 a destructive forward space. If so, the processing system 106 performs 508 a destructive backspace. For devices which offer automatic key repeating while a key is held down, a repeating destructive forward space preferably will terminate when the cursor reaches the end of the message and will not turn into a destructive backspace unless the user first releases the delete key and then again depresses the delete key. The bidirectional delete mode 500 advantageously reduces the required number of delete keys and simplifies operation of the delete function, thereby aiding the user to operate the portable subscriber unit 100.

It will be appreciated that the portable subscriber unit 100 in accordance with the present invention can be implemented with from one to all five of the supplemental modes 200, 300, 301, 400, 500 programmed therein. Depending upon the number of supplemental modes implemented, the user is able to select a supplemental mode from as few as one supplemental mode to as many as all five supplemental modes.

Thus, it should be clear from the preceding disclosure that the present invention provides a method and apparatus in an electronic device for supplementing the keyboard and for helping a user to operate the electronic device. Through a unique combination of supplemental operational modes the present invention advantageously anticipates the needs of the user in an intelligent manner.

Many modifications and variations of the present invention are possible in light of the above teachings. For example, while the present invention has been embodied in an exemplary portable subscriber unit, the present invention is applicable to virtually any keyboard/display device. Thus, it is to be understood that, within the scope of the appended claims, the invention can be practiced other than as described herein above.

What is claimed is:

1. A method in an electronic device having a keyboard and a display, the method for supplementing the keyboard and for helping a user to operate the electronic device, the method comprising the steps of:

displaying on the display a message entered through the keyboard;

selecting a supplemental mode, in response to entry of a first predetermined key sequence by the user, the supplemental mode selected in accordance with the first predetermined key sequence, from at least one of a group of supplemental modes included in the electronic device, comprising:

an acronym mode;

a supplemental scrolling keyboard mode;

a predictive character pairing mode;

a predictive menuing mode; and a bi-directional delete mode; and operating in accordance with the supplemental mode until an occurrence of at least one of (a) the user entering a second predetermined key sequence and (b) the supplemental mode executing to completion.

2. The method of claim 1, wherein the selecting step comprises the step of selecting the supplemental mode from at least two of the group of supplemental modes.

3. The method of claim 1, wherein the selecting step comprises the step of selecting the supplemental mode from at least three of the group of supplemental modes.

4. The method of claim 1, wherein the selecting step comprises the step of selecting the supplemental mode from at least four of the group of supplemental modes.

5. The method of claim 1, wherein the selecting step comprises the step of selecting the supplemental mode from at least five of the group of supplemental modes.

6. The method of claim 1, wherein the method further comprises the step of sending the message from the electronic device to a receiver, in response to keyboard entries made by the user in the predictive menuing mode.

7. An electronic device for supplementing a keyboard and for helping a user to operate the electronic device, comprising:

a processing system for controlling the electronic device;

the keyboard coupled to the processing system for entering a message and storing the message in the processing system;

a display coupled to the processing system for displaying the message;

wherein the processing system is programmed to select a supplemental mode, in response to entry of a first predetermined key sequence by the user, the supplemental mode selected in accordance with the first predetermined key sequence, from at least one of a group of supplemental modes included in the electronic device, comprising:

an acronym mode;
a supplemental scrolling keyboard mode;
a predictive character pairing mode;
a predictive menuing mode; and
a bi-directional delete mode; and wherein the processing system is further programmed to operate in accordance with the supplemental mode until an occurrence of at least one of (a) the user entering a second predetermined key sequence and (b) the supplemental mode executing to completion.

8. The electronic device of claim 7, wherein the processing system is further programmed to select the supplemental mode from at least two of the group of supplemental modes.

9. The electronic device of claim 7, wherein the processing system is further programmed to select the supplemental mode from at least three of the group of supplemental modes.

10. The electronic device of claim 7, wherein the processing system is further programmed to select the supplemental mode from at least four of the group of supplemental modes.

11. The electronic device of claim 7, wherein the processing system is further programmed to select the supplemental mode from at least five of the group of supplemental modes.

12. The electronic device of claim 7, further comprising a transmitter coupled to the processing system for sending the message from the electronic device to a receiver, in response to keyboard entries made by the user in the predictive menuing mode.

13. A portable subscriber unit for supplementing a keyboard and for helping a subscriber to operate the portable subscriber unit, comprising:

a receiver for receiving information;
a processing system coupled to the receiver for processing the information and for controlling the portable subscriber unit;
the keyboard coupled to the processing system for entering a message and storing the message in the processing system;
a display coupled to the processing system for displaying the message; and
a transmitter coupled to the processing system for transmitting the message,
wherein the processing system is programmed to select a supplemental mode, in response to entry of a first predetermined key sequence by the subscriber, the supplemental mode selected in accordance with the first predetermined key sequence, from at least one of a group of supplemental modes included in the portable subscriber unit, comprising:
an acronym mode;
a supplemental scrolling keyboard mode;
a predictive character pairing mode;
a predictive menuing mode; and
a bi-directional delete mode; and
wherein the processing system is further programmed to operate in accordance with the supplemental mode until an occurrence of at least one of (a) the subscriber entering a second predetermined key sequence and (b) the supplemental mode executing to completion.

14. The portable subscriber unit of claim 13, wherein the processing system is further programmed to select the supplemental mode from at least two of the group of supplemental modes.

15. The portable subscriber unit of claim 13, wherein the processing system is further programmed to select the supplemental mode from at least three of the group of supplemental modes.

16. The portable subscriber unit of claim 13, wherein the processing system is further programmed to select the supplemental mode from at least four of the group of supplemental modes.

17. The portable subscriber unit of claim 13, wherein the processing system is further programmed to select the supplemental mode from at least five of the group of supplemental modes.

18. The portable subscriber unit of claim 13, wherein the processing system is programmed to control the transmitter to send the message from the portable subscriber unit to a receiver in a wireless transmission, in response to keyboard entries made by the subscriber in the predictive menuing mode.

* * * * *